United States Patent
Querejeta Andueza et al.

(10) Patent No.: US 8,567,062 B2
(45) Date of Patent: Oct. 29, 2013

(54) METHOD FOR ASSEMBLING AN ELECTROMAGNETIC GAS VALVE, AND ELECTROMAGNETIC GAS VALVE

(75) Inventors: Félix Querejeta Andueza, Vitoria-Gasteiz (ES); Francisco Javier Echenausía Saez de Zaitegui, Aretxabaleta (ES); José Ignacio Múgica Odriozola, Bergara (ES)

(73) Assignee: Coprecitec, S.L., Aretxabaleta (ES)

( * ) Notice: Subject to any disclaimer, the term of this patent is extended or adjusted under 35 U.S.C. 154(b) by 212 days.

(21) Appl. No.: 13/271,032

(22) Filed: Oct. 11, 2011

(65) Prior Publication Data
US 2012/0090177 A1   Apr. 19, 2012

(30) Foreign Application Priority Data
Oct. 19, 2010   (EP) .................................... 10382272

(51) Int. Cl.
*B21K 1/20* (2006.01)
*F16K 31/66* (2006.01)

(52) U.S. Cl.
USPC .............. 29/890.124; 29/890.125; 137/487.5; 137/505.41; 251/129.15; 251/366

(58) Field of Classification Search
USPC .......... 29/890.124, 890.125; 137/14, 66, 271, 137/337, 487.5, 505, 505.41, 613; 251/75, 251/129.15, 366
See application file for complete search history.

(56) References Cited

U.S. PATENT DOCUMENTS

| | | | |
|---|---|---|---|
| 3,447,775 A | 6/1969 | Katchka et al. | |
| 3,502,101 A | 3/1970 | Willson et al. | |
| 3,936,919 A * | 2/1976 | Genbauffe | 29/890.124 |
| 4,802,507 A * | 2/1989 | Willson | 137/613 |
| 5,215,115 A | 6/1993 | Dietiker | |
| 5,988,204 A * | 11/1999 | Reinhardt et al. | 137/271 |
| 2010/0108927 A1 | 5/2010 | Perz et al. | |

FOREIGN PATENT DOCUMENTS

| | | |
|---|---|---|
| DE | 19748570 A1 | 5/1999 |
| EP | 1382907 A1 | 7/2002 |
| GB | 2017870 A | 10/1979 |

OTHER PUBLICATIONS

European Search Report for EP 10382272.2-1266; Date: Jul. 4, 2011; European Patent Office, Netherlands.

* cited by examiner

*Primary Examiner* — Alexander P Taousakis
(74) *Attorney, Agent, or Firm* — Tim L. Kitchen; Peter B. Scull; Hamilton, DeSanctis & Cha, LLP

(57) ABSTRACT

A method of assembling an electromagnetic gas valve having a first body, a second body, a unit comprising a valve disc and stem assembly coupled to a moveable insulating structure having a projecting member, an electromagnet assembly comprising a magnet fixed within the second body and a coil wound on a moving part with a cavity adapted to receive the projecting member, the first body having a gas inlet, a gas outlet and a through hole disposed between the gas inlet and outlet. In one implementation the insulating structure is coupled to the electromagnetic assembly by introducing a fluid under pressure into the gas outlet or gas inlet to act upon the unit to cause the projecting member to move in a direction towards the inside of the second body and into the cavity of the moving part of the electromagnet assembly.

22 Claims, 3 Drawing Sheets

METHOD FOR ASSEMBLING AN ELECTROMAGNETIC GAS VALVE, AND ELECTROMAGNETIC GAS VALVE

CROSS-REFERENCE TO RELATED APPLICATIONS

This application relates to and claims the benefit and priority to European Patent Application No. EP10382272, filed Oct. 19, 2010.

TECHNICAL FIELD

This invention relates electromagnetic gas valves and to methods for assembling electromagnetic gas valves.

BACKGROUND

Gas valves are generally used to control or regulate the flow of gas that reaches a burner (or other device of this type), thereby regulating the flame that is generated in the burner. The valves comprise a gas inlet through which they receive the gas coming from a gas source, for example, a gas outlet through which the regulated flow of gas exits to the burner, a through hole that communicates the inlet with the outlet, and a valve disc that cooperates with the through hole to regulate the flow of gas, thereby regulating the outlet flow of gas towards the burner.

Electromagnetic gas valves also comprise electromagnetic means that act upon the valve disc so that the valve disc cooperates with the through hole when required. For example, U.S. Pat. No. 5,215,115 A discloses an electromagnetic gas valve of this type, which comprises a first body that comprises a gas enclosure with an inlet, an outlet and a through hole that communicates the outlet with the inlet, a second body that comprises an air enclosure where the actuator means is disposed, and insulating means disposed between both bodies, which close the first body (the gas enclosure) in a sealed manner in relation to the second body (the air enclosure).

SUMMARY OF THE DISCLOSURE

In a method for assembling an electromagnetic valve, regulation means is disposed in a first body of the valve, which comprises a gas enclosure with a gas inlet, a gas outlet, and a through hole that provides a fluid communication path between the inlet and the outlet, electromagnetic means is disposed inside a second body of the valve, insulating means is disposed on the first body or on the second body of the valve, and the first body and the second body are joined to each other, the insulating means being positioned between both bodies. The electromagnetic means acts on the regulation means so that the regulation means regulates the passage of gas between the inlet and the outlet through the through hole.

According to one method a unit is also formed by connecting the insulating means and the regulation means to each other, and, once the bodies have been connected together, the unit is coupled to the electromagnetic means by the blowing of a fluid under pressure, preferably air, into the gas enclosure of the first body through the outlet and/or the inlet, the fluid pushing the unit towards the second body to cause the unit to be coupled to the electromagnetic means.

The unit is thus coupled to the electromagnetic means, with the result that the electromagnetic means can act upon the regulation means, the electromagnetic means thereby being able to regulate the gas.

The electromagnetic gas valve may comprise a first body that comprises a gas enclosure with a gas inlet, a gas outlet, and a through hole through which the outlet is communicated with the inlet, regulation means adapted for regulating the passage of gas through the through hole, electromagnetic means that acts upon the regulation means to regulate the passage of gas, a second body that delimits an air enclosure where the electromagnetic means is disposed, and which is joined to the first body, and insulating means to keep the gas enclosure of the first body closed in a sealed manner in relation to the air enclosure of the second body when the bodies are joined. The regulation means and the insulating means are connected to form a unit, the unit being connected to the electromagnetic means.

As a result, as the unit is coupled to the electromagnetic means, the electromagnetic means is able to act upon the regulation means to control the flow of gas through the valve.

These and other advantages and characteristics of the invention will be made evident in the light of the drawings and the detailed description thereof.

DETAILED DESCRIPTION

Figure 1:
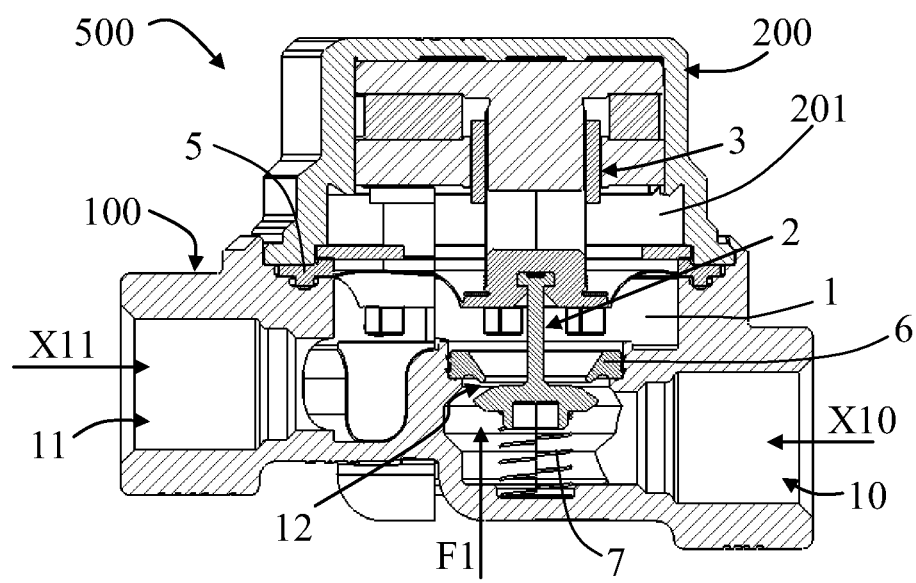
FIG. 1 shows a cross-sectional view of an embodiment of an electromagnetic gas valve.
Figure 2:
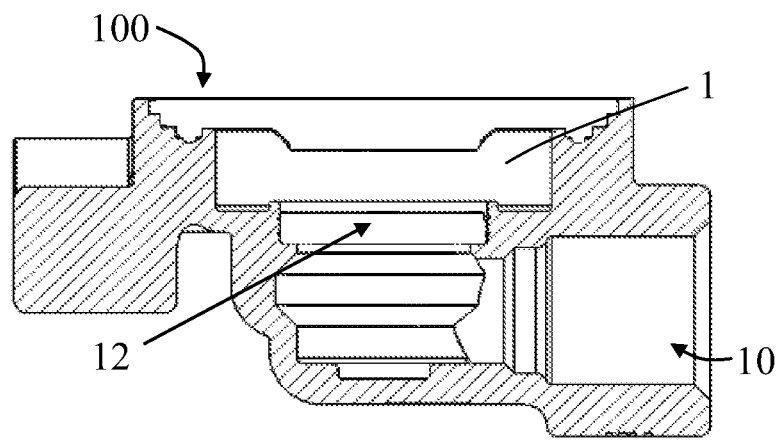
FIG. 2 shows a cross-sectional view of a first body of the valve of FIG. 1.
Figure 3:
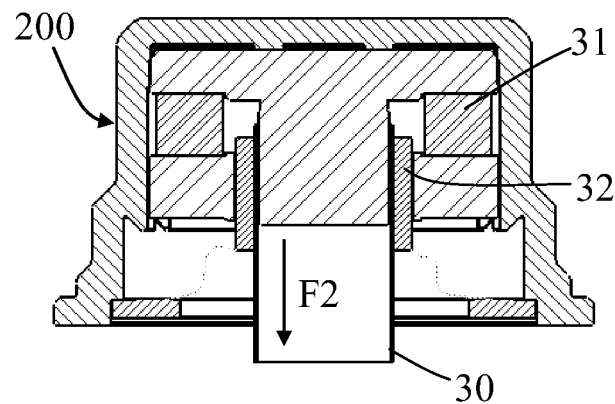
FIG. 3 shows a cross-sectional view of a second body of the valve of FIG. 1, with electromagnetic means housed in the second body.
Figure 4:
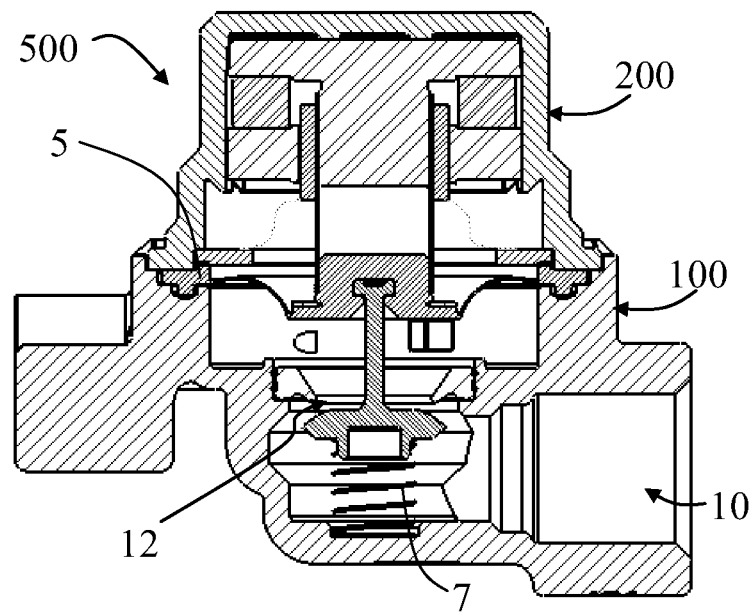
FIG. 4 shows a cross-sectional view of the valve of FIG. 1 being open.
Figure 5:
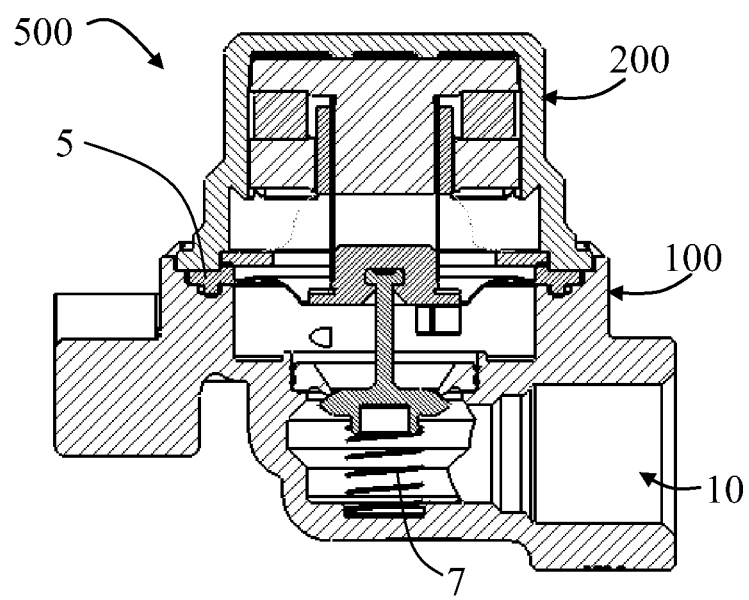
FIG. 5 shows a cross-sectional view of the valve of FIG. 1 being closed.

FIGS. 1, 4 and 5 show an embodiment of an electromagnetic gas valve 500. The valve 500 comprises a first body 100, shown by way of example in FIG. 2, which comprises a gas enclosure 1 with a gas inlet 10, a gas outlet 11, and a through hole 12 through which the outlet 11 is communicated with the inlet 10, regulation assembly 2 that comprises a valve disc and stem assembly and which is adapted for regulating the passage of gas through the through hole 12, an electromagnetic assembly 3 that acts upon the regulation assembly 2 to regulate the passage of gas, a second body 200, shown by way of example in FIG. 3, that delimits an air enclosure 201 where the electromagnetic assembly 3 is disposed, and which is joined to the first body 100, and an insulating structure 5 to keep the gas enclosure 1 of the first body 100 closed in a sealed manner in relation to the air enclosure 201 of the second body 200 when the bodies 100 and 200 are joined, the insulating structure 5 preferably comprising a membrane made of elastic material.

In the embodiment of FIGS. 1, 4 and 5, the electromagnetic assembly 3 comprises a static permanent magnet 31, a moving part 30 and a coil 32 wound on the moving part 30, as shown in the example of FIG. 3. When the coil 32 is supplied a current a magnetic field is generated between the coil 32 and the permanent magnet 31 which gives rise to a regulation force F2 that causes the moving part 30 to move when the regulation force F2 exceeds an opposite maintenance force F1 exerted by closure means 7 of the valve 500, the movement of the moving part 30 causing a movement of the regulation assembly 2, thereby opening the passage of gas through the through hole 12, as shown by way of example in FIG. 4. The closure means 7 comprises a spring that in the absence of a current being supplied to the coil 32 cause the disc of the regulation assembly 2 to close the through hole 12 completely, as shown by way of example in FIG. 5. Depending on the value of the supply current applied to the coil 32 the movement of the moving part 30 and therefore the regulation assembly 2 can be regulated, the flow of gas through the through hole 12 and therefore through the outlet 11 of the valve 500 being capable of being regulated. In one embodiment the spring of the closure means 7 is housed in the gas enclosure 1 of the first body 100 of the valve 500, joined at one end to the first body 100 and at the other end to the regulation assembly 2.

Figure 6:
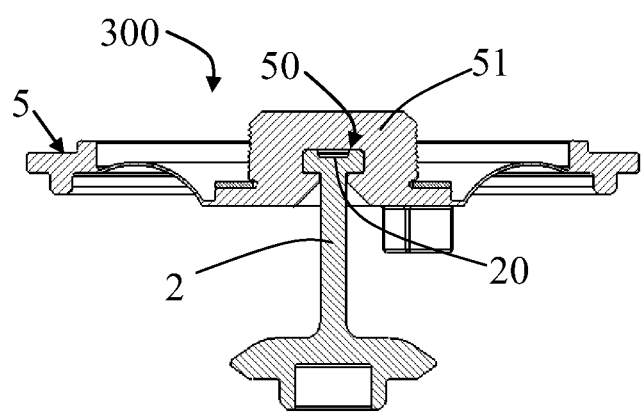
FIG. 6 is a cross-sectional view of a unit of the valve of FIG. 1.

In the embodiment shown in the Figures, the regulation assembly 2 and the insulating structure 5 are joined to form a unit 300, as shown by way of example in FIG. 6. In the embodiment, the insulating structure 5 comprises a connection housing 50 where an area of connection 20 (e.g., an enlarged portion of the stem) of the regulation assembly 2 is coupled to form the unit 300, and the unit 300 is coupled to the electromagnetic assembly 3, so that the unit 300 moves in conjunction with the moving part 30 of the electromagnetic assembly 3. The moving part 30 may be substantially hollow, the unit 300 comprising a projection 51 housed at least partially and without freedom of movement, locked, inside the moving part 30, the unit 300 thereby moving in conjunction with the moving part 30. In one embodiment the projection 51 is a part of the insulating structure.

Assembly of the valve 500 may occur with the regulation assembly 2 being disposed in the first body 100 of the valve 500, the electromagnetic assembly 3 being disposed inside the second body 200 of the valve 500, the insulating structure 5 being disposed on the first body 100 or on the second body 200, and the first body 100 and the second body 200 are joined to each other, the insulating structure 5 being positioned between both bodies 100 and 200. In one embodiment the electromagnetic assembly 3 is disposed in the second body 200 after having been tested for proper operation, thus ensuring, in a simple manner, that it operates correctly before the valve 500 is assembled. Once the bodies 100 and 200 are joined to each other, the unit 300 is coupled to the electromagnetic assembly 3 by the blowing of a fluid under pressure, preferably air, into the gas enclosure 1 of the first body 100 through the outlet 11 in the direction X11 and/or the inlet 10 in the direction X10, as shown by way of example in FIG. 1, the fluid pushing the unit 300 towards the inside of the second body 200, the insulating structure 5 being housed at least partially in the moving part 30 of the electromagnetic assembly 3. As a result, the unit 300 is coupled to the electromagnetic assembly 3, the electromagnetic assembly 3 being capable of acting correctly on the regulation assembly 2 that forms part of the unit 300, thus making it possible to regulate the gas in the valve 500. In an embodiment the fluid is introduced into the gas enclosure 1 through the outlet 11 and the inlet 10 at the same time.

The valve 500 may also comprise a flow passage member 6 disposed in a fixed manner on the first body 100 of the valve 500, with a central hole that that acts as a through hole 12. In such a case, the regulation assembly 2 cooperates with the flow passage member 6 to regulate the passage of gas through the through hole 12. As the fluid under pressure pushes the unit 300, the insulating structure 5 is pushed on the one hand, with the projection 51 being housed in the moving part 30, and the regulation assembly 2 on the other, which close the through hole 12, thereby ensuring that unless the electromagnetic assembly 3 acts, passage through the through hole 12 is closed to prevent gas from passing through the valve 500. The insulating member 5 is disposed on the first body 100 before the regulation assembly 2 is housed in the first body 100. In one implementation the flow passage member 6 comprises an elastic material.

The unit 300 may be formed before the insulating structure 5 is disposed on the first body 100 or on the second body 200, and in one embodiment the unit 300 is disposed on the first body 100 when the insulating structure 5 is disposed on the first body 100 or on the second body 200 of the valve 500, so that the regulation assembly 2 is housed in the first body 100. The second body 200 is then disposed on the unit 300 that has already been disposed on the first body 100, the second body 200 being fixed to the first body 100 (by means of screws or equivalent means, for example). Before the second body 200 is disposed on the unit 300, the electromagnetic assembly 3 is housed in the air enclosure 201 of the second body 200.

When coupling the unit 300 to the electromagnetic assembly 3, the fluid is blown for a preset period of time that is long enough to dispose the projection 51 within the hollow portion of the moving part 30, and after the fluid is no longer blown it is drained through the conduit (outlet 11 and/or inlet 10) through which it had been blown.

In another embodiment of the method of the invention, the unit 300 is disposed on the second body 200 of the valve 500 so that the regulation assembly 2 is outside the second body 200. The first body 100 is disposed on the unit 300 once the unit 300 has been disposed on the second body 200, the first body 100 being fixed to the second body 200 (by means of screws or equivalent means, for example). Before the unit 300 is disposed on the second body 200 the electromagnetic assembly 3 is housed in the air enclosure 201 of the second body 200.

What is claimed is:

1. A method of assembling an electromagnetic gas valve that comprises a first body, a second body, a unit comprising a valve disc and stem assembly coupled to a moveable insulating structure having a projecting member, an electromagnet assembly comprising a magnet fixed within the second body and a coil wound on a moving part with a cavity adapted to receive the projecting member, the first body having a gas inlet, a gas outlet and a through hole disposed between the gas inlet and the gas outlet, in operation the moving part of the electromagnetic assembly acts upon the valve disc and stem assembly to move the disc in a manner to regulate the passage of gas between the gas inlet and the gas outlet through the through hole, the method of assembling the electromagnetic gas valve comprising:

providing the second body having the electromagnetic assembly, disposing the unit on the first body or on the second body, joining together the first body and the second body so that the insulating structure is positioned between the first and second bodies and so that the valve disc resides below the through hole in the first body; and coupling the insulating structure to the electromagnetic assembly by introducing a fluid under pressure into the gas outlet or gas inlet to act upon the unit to cause the projecting member to move in a direction towards the inside of the second body and into the cavity of the moving part of the electromagnet assembly.

2. The method of claim 1, further comprising forming the unit by coupling the stem of the valve disc and stem assembly to the insulating structure.

3. The method of claim 2, wherein the projecting member of the insulating structure comprises a connection housing adapted to receive an enlarged end portion of the stem, the unit formed by positioning the enlarged end portion of the stem into the connection housing.

4. The method of claim 1, wherein the insulating structure comprises a membrane made of an elastic material.

5. The method of claim 1, wherein the through hole is a part of a flow passage member disposed in the first body.

6. A method of assembling an electromagnetic gas valve that comprises a first body, a second body, a regulating assembly comprising a valve disc joined to a stem, a moveable insulating structure having a projecting member, an electromagnet assembly comprising a magnet fixed within the second body and a coil wound on a moving part with a cavity adapted to receive the projecting member, the first body having a gas inlet, a gas outlet and a through hole disposed between the gas inlet and the gas outlet, in operation the moving part of the electromagnetic assembly acts upon the regulating assembly to move the disc in a manner to regulate the passage of gas between the gas inlet and the gas outlet through the through hole, the method of assembling the electromagnetic gas valve comprising:
  providing the second body having the electromagnetic assembly,
  coupling the stem of the regulating assembly to the insulating structure so that the regulating assembly and insulating structure form a unit,
  disposing the unit on the first body so that the valve disc resides below the through hole,
  joining together the first body and the second body with the insulating structure being positioned between the first and second bodies; and
  coupling the insulating structure to the electromagnetic assembly by introducing a fluid under pressure into the gas outlet or gas inlet to act upon the unit to cause the projecting member to move in a direction towards the inside of the second body and into the cavity of the moving part of the electromagnet assembly.

7. The method of claim 6, wherein the projecting member of the insulating structure comprises a connection housing adapted to receive an enlarged end portion of the stem, the unit formed by positioning the enlarged end portion of the stem into the connection housing.

8. The method of claim 6, wherein the insulating structure comprises a membrane made of an elastic material.

9. The method of claim 6, wherein the through hole is a part of a flow passage member disposed in the first body.

10. A method of assembling an electromagnetic gas valve that comprises a first body, a second body, a regulating assembly comprising a valve disc joined to a stem, a moveable insulating structure having a projecting member, an electromagnet assembly comprising a magnet fixed within the second body and a coil wound on a moving part with a cavity adapted to receive the projecting member, the first body having a gas inlet, a gas outlet and a through hole disposed between the gas inlet and the gas outlet, in operation the moving part of the electromagnetic assembly acts upon the regulating assembly to move the disc in a manner to regulate the passage of gas between the gas inlet and the gas outlet through the through hole, the method of assembling the electromagnetic gas valve comprising:
  providing the second body having the electromagnetic assembly,
  coupling the stem of the regulating assembly to the insulating structure so that the regulating assembly and insulating structure form a unit,
  disposing the unit on the second body,
  joining together the first body and the second body so that the insulating structure is positioned between the first and second bodies and so that the valve disc resides below the through hole in the first body; and
  coupling the insulating structure to the electromagnetic assembly by introducing a fluid under pressure into the gas outlet or gas inlet to act upon the unit to cause the projecting member to move in a direction towards the inside of the second body and into the cavity of the moving part of the electromagnet assembly.

11. The method of claim 10, wherein the projecting member of the insulating structure comprises a connection housing adapted to receive an enlarged end portion of the stem, the unit formed by positioning the enlarged end portion of the stem into the connection housing.

12. The method of claim 10, wherein the insulating structure comprises a membrane made of an elastic material.

13. The method of claim 10, wherein the through hole is a part of a flow passage member disposed in the first body.

14. A method of assembling an electromagnetic gas valve that comprises a first body, a second body, a regulating assembly comprising a valve disc joined to a stem, a moveable insulating structure having a projecting member, an electromagnet assembly comprising a magnet fixed within the second body and a coil wound on a moving part with a cavity adapted to receive the projecting member, the first body having a gas inlet, a gas outlet and a through hole disposed between the gas inlet and the gas outlet, in operation the moving part of the electromagnetic assembly acts upon the regulating assembly to move the disc in a manner to regulate the passage of gas between the gas inlet and the gas outlet through the through hole, the method of assembling the electromagnetic gas valve comprising:
  providing the second body having the electromagnetic assembly,
  coupling the stem of the regulating assembly to the insulating structure so that the regulating assembly and insulating structure form a unit,
  disposing the unit on the second body,
  joining together the first body and the second body so that the insulating structure is positioned between the first and second bodies and so that the valve disc resides below the through hole in the first body; and
  coupling the insulating structure to the electromagnetic assembly.

15. The method of claim 14, wherein the projecting member of the insulating structure comprises a connection housing adapted to receive an enlarged end portion of the stem, the unit formed by positioning the enlarged end portion of the stem into the connection housing.

16. The method of claim 14, wherein the insulating structure is coupled to the electromagnetic assembly by introducing a fluid under pressure into the gas outlet or gas inlet to act upon the unit to cause the projecting member to move in a direction towards the inside of the second body and into the cavity of the moving part of the electromagnet assembly.

17. The method of claim 14, wherein the insulating structure comprises a membrane made of an elastic material.

18. The method of claim 14, wherein the through hole is a part of a flow passage member disposed in the first body.

19. A method of assembling an electromagnetic gas valve that comprises a first body, a second body, a unit comprising a valve disc and stem assembly coupled to a moveable insulating structure having a projecting member, a flow passage member comprising a through hole, an electromagnet assembly comprising a magnet fixed within the second body and a coil wound on a moving part with a cavity adapted to receive the projecting member, the first body having a gas inlet and a gas outlet, in operation the moving part of the electromagnetic assembly acts upon the valve disc and stem assembly to move the disc in a manner to regulate the passage of gas between the gas inlet and the gas outlet through the through hole, the method of assembling the electromagnetic gas valve comprising:

providing the second body having the electromagnetic assembly, disposing the flow passage member in a fixed manner on the first body, disposing the unit on the first body or on the second body, joining together the first body and the second body so that the insulating structure is positioned between the first and second bodies and so that the valve disc resides below the through hole of the flow passage member; and coupling the insulating structure to the electromagnetic assembly by introducing a fluid under pressure into the gas outlet or gas inlet to act upon the unit to cause the projecting member to move in a direction towards the inside of the second body and into the cavity of the moving part of the electromagnet assembly.

20. The method of claim 19, further comprising forming the unit by coupling the stem of the valve disc and stem assembly to the insulating structure.

21. The method of claim 20, wherein the projecting member of the insulating structure comprises a connection housing adapted to receive an enlarged end portion of the stem, the unit formed by positioning the enlarged end portion of the stem into the connection housing.

22. The method of claim 19, wherein the insulating structure comprises a membrane made of an elastic material.

* * * * *